UNITED STATES PATENT OFFICE.

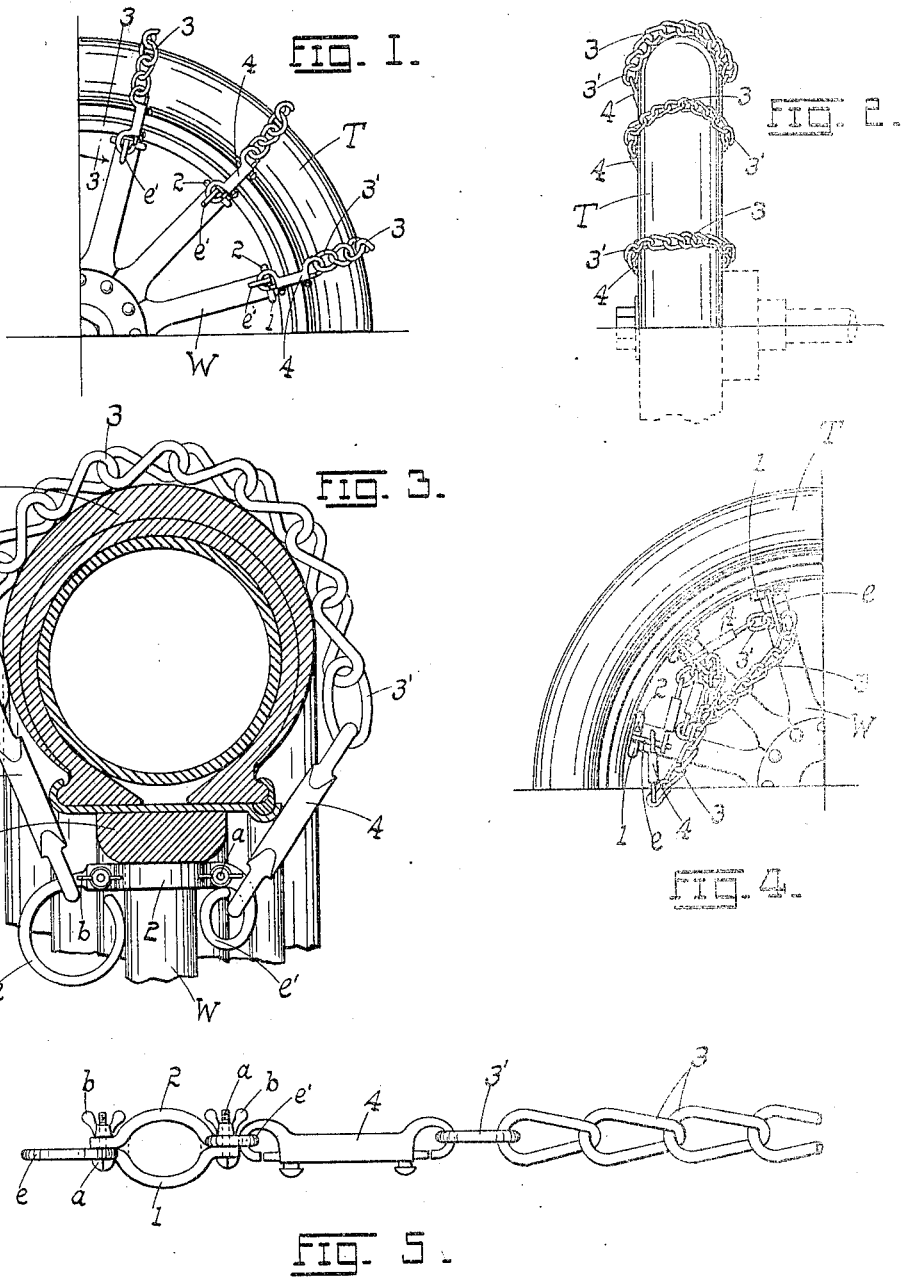

CHARLES R. RAWDON AND EDWARD M. PARKER, OF ST. LOUIS, MISSOURI.

ANTISKID-CHAIN.

1,086,558.

Specification of Letters Patent.

Patented Feb. 10, 1914.

Application filed December 5, 1912. Serial No. 735,084.

*To all whom it may concern:*

Be it known that we, CHARLES R. RAWDON and EDWARD M. PARKER, citizens of the United States, residing at St. Louis, State of Missouri, have invented certain new and useful Improvements in Antiskid-Chains, of which the following is a full, clear, and exact description, reference being had to the accompanying drawings, forming a part hereof.

Our invention has relation to improvements in anti-skid chains for vehicle-wheel tires; and it consists in the novel details of construction more fully set forth in the specification and pointed out in the claim.

In the drawings, Figure 1 is an outer face view of a quarter of a vehicle-wheel showing our invention applied thereto; Fig. 2 is an edge view of the same; Fig. 3 is an enlarged cross-section taken through the rim and tire on the line 3—3 of Fig. 1; Fig. 4 is an inner face view of the wheel shown in Fig. 1, with the anti-skid chains shown out of service; and Fig. 5 is a plan of one half of the chain with one of its terminal snap-hooks.

The object of our invention is to provide an anti-skid chain for vehicle-wheel tires, and particularly pneumatic tires, which may be readily put out of commission when not desired to be kept in service or when the vehicle is running over a road where the chain is either undesirable or unnecessary.

A further object is to provide securing means for said chain which will admit of ready attachment, or removal of the latter for purposes of renewal.

A further object is to provide means whereby the chain may be left secured to the wheel though it be out of commission as an anti-skid device.

The invention presents further and other advantages better apparent from a detailed description thereof which is as follows:—

Referring to the drawings, W represents the spoke or body portion of an automobile wheel, R the rim or felly thereof, and T the pneumatic tire passed over the rim.

In the present embodiment of our invention, when a spoke wheel is to be equipped with our attachment, we employ a clamp composed of two separable sections 1, 2, which when assembled are adapted to embrace the spoke W of the wheel, the two sections being secured to each other by means of headed screws *a* terminating in wing-nuts *b* by which the clamp-sections are not only drawn firmly together, but are securely fastened to the spoke. The inner terminal of the section 1 is formed into an enlarged loop or eye *e*, and the outer terminal of the section 2 is formed into a smaller loop or eye *e'*, thus disposing the entire series of loops *e* on the inside of the wheel, the loops *e'* being disposed on the outside. In practice the clamp is fastened to the spoke so as to bear against the inner face of the rim, the latter preventing outward or radial displacement of the clamp once the clamp is secured to its spoke.

Passed transversely across the tire T, are series of anti-skidding chains 3 terminating at opposite ends in preferably circular members or rings 3', the respective rings carrying conventional snap-hooks 4 adapted to be secured to the eyes *e*, *e'*, respectively whereby each chain 3 is thus secured in proper position across the tire and serves as an anti-skid chain therefor.

It will be seen from the foregoing that the snap-hooks permit the instantaneous removal or attachment of a chain when necessary or desirable. When it is desired to put the chains out of commission, and yet allow them to be secured to the wheel, the chauffeur or driver detaches the outer snap-hooks from the eyes *e'*, leaving the chains secured to the inner larger eyes *e*. Each chain thus secured is passed through the eye *e* on a contiguous spoke, then doubled on itself and its free end (that detached from the eye *e'*) secured to the eye *e* of the first spoke, and so on through the series (see Fig. 4). In this way the several chains may be left secured to the wheel, and, being disposed on the inside, they are out of the way and hence not objectionable. The larger eyes *e* permit the passage therethrough of the chains for the purpose specified. When desired to serve as anti-skids the outer ends of the chains may be again detached from the eyes *e*, passed across the tire and their outer ends fastened to the eyes *e'*, when they will again be brought into service. When a chain is worn both ends may be instantly uncoupled from the securing clamp, and a new chain substituted.

The present device may of course, be used in connection with solid tires, its hold on the tire not depending on the inflation of the tire as is the case with the prevailing construction of anti-skid chains.

The anti-skid member need not of course, be a "chain", any equivalent thereof being contemplated by the present invention.

It will be seen that the loops $e$, $e'$, (Fig. 3) are disposed each wholly to one side of its respective clamp section. Where the felly R is unusually thick, the clamp sections 1, 2, may be secured to the spoke in a position reverse to that shown in the drawing, so that the loops $e$, $e'$, will point toward the tire T or away from the hub of the wheel instead of toward said hub as now shown. This reversibility of the clamp is important because with unusually thick or heavy fellies, the loops $e$, $e'$, may still be brought close to the base of the tire T or to the periphery of the felly, thus obviating the necessity for lengthening the chain 3.

When the clamp-sections 1, 2, are assembled about the spoke to which they are attached, the loops $e$, $e'$, thereof will be disposed on opposite sides of the plane of separation between the sections (Fig. 5). It follows therefore that the chain coupled to the loops must be passed diagonally around the tire or at a slight incline to the plane of rotation of the wheel, thus causing the chain to exert a shearing grip on the ground passed over. This disposition of the chain is important for then it serves as a perfect anti-skid device.

Having described our invention, what we claim is:

In combination with a vehicle wheel having a spoked body and a rim, a tire encompassing the rim, clamps each comprising two sections embracing the spokes and positioned in proximity to the rim, the respective sections terminating in loops or eyes of unequal dimensions disposed on opposite sides of the plane of separation between the sections, the smaller loops being limited to come inside the plane tangent to the outer side of the tire whereby said loops are protected against impact with objects near the wheel, the larger loops being opposite the inner face of the wheel, and chains passed across the tire and having their ends detachably secured to the loops, the dimensions of the inner loops being sufficient to allow the chains detached from the outer loops to be passed therethrough and their ends fastened to adjacent loops of the inner series, when the chains are out of commission.

In testimony whereof we affix our signatures, in presence of two witnesses.

CHARLES R. RAWDON.
EDWARD M. PARKER.

Witnesses:
EMIL STAREK,
JOS. A. MICHEL.